(12) United States Patent
Krivitsky et al.

(10) Patent No.: US 12,145,760 B2
(45) Date of Patent: Nov. 19, 2024

(54) AUTONOMOUS PACKING SYSTEM AND METHOD FOR PACKING GOODS

(71) Applicant: 1MROBOTICS LTD., Bnei Darom (IL)

(72) Inventors: Dima Krivitsky, Richmond Hill (CA); Igor Levinsky, Tel Aviv (IL); Itai Price, Tel Aviv (IL); Amit Avizemil, Holon (IL); Yadin Aharoni, Tel Aviv (IL); Razi Berg, Herzliya (IL); Roee Tuval, Holon (IL); Eyal Yair, Bnei Darom (IL)

(73) Assignee: 1MROBOTICSS LTD., Bnei Darom (IL)

( * ) Notice: Subject to any disclaimer, the term of this patent is extended or adjusted under 35 U.S.C. 154(b) by 0 days.

(21) Appl. No.: 17/685,477

(22) Filed: Mar. 3, 2022

(65) Prior Publication Data
US 2023/0278742 A1    Sep. 7, 2023

(51) Int. Cl.
| | |
|---|---|
| *B65B 57/14* | (2006.01) |
| *B65B 57/16* | (2006.01) |
| *G06Q 10/08* | (2024.01) |
| *G06Q 10/087* | (2023.01) |

(52) U.S. Cl.
CPC .............. *B65B 57/14* (2013.01); *B65B 57/16* (2013.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 4,805,383 | A   * | 2/1989  | Allwein   | B65B 11/08 |
| | | | | 53/586 |
| 9,776,747 | B2 * | 10/2017 | Takahashi | B65B 57/04 |
| 2004/0065050 | A1 * | 4/2004  | Sauer     | B65B 27/08 |
| | | | | 53/399 |
| 2018/0259092 | A1 * | 9/2018  | McDonald  | F16K 3/184 |

FOREIGN PATENT DOCUMENTS

| | | | | |
|---|---|---|---|---|
| CN | 113320750 A | * | 8/2021 | ............ B65B 11/02 |
| EP | 2860116 A1  | * | 4/2015 | ............ B65B 11/10 |

* cited by examiner

*Primary Examiner* — Tanzim Imam
(74) *Attorney, Agent, or Firm* — AlphaPatent Associates Ltd.; Daniel J. Swirsky (57) ABSTRACT

An autonomous packing apparatus, including a body, a shelf coupled to the body for placing goods, a shelf actuator for moving the shelf relative to the body, output device for outputting a packing material for packing the goods while the goods are located on the shelf, a computerized management system coupled to the shelf actuator and to the output device, including a set of instructions for outputting a first portion of the packing material before the goods are placed on the shelf, moving the shelf after the goods are placed on the shelf, and outputting a second portion of the packing material after the goods are placed on the shelf.

16 Claims, 5 Drawing Sheets

FIG. 4B

# AUTONOMOUS PACKING SYSTEM AND METHOD FOR PACKING GOODS

FIELD

The invention relates generally to autonomous packing systems and methods for packing goods.

BACKGROUND

There is a growing need for delivery services, mainly in the on-demand space. Consumers require that the goods are provided within short time durations (SLAs), sometimes within an hour or two, or even less, from the request time. This requires companies to increase efforts in the "last mile", to be closer to the consumers' residences and offices, as opposed to having larger warehouses outside city centers, which was the standard in the past. Companies need sufficient geographic coverage in cities in order to supply the goods quickly.

The goods are likely to be provided in a single package containing multiple goods ordered in a single order, for example multiple bottles, a combination of bottles and cans, a combination of food items and beverage items and the like. In order to reduce operational costs of the delivery stations that provide the orders to the customers, there is a need to provide delivery stations which are fully autonomous, meaning there is no person working inside the delivery station. As such, there is a need for an autonomous packing system for packing the goods requested in the customers' orders. In addition, it is desired to limit the size of the delivery station as such stations are located in expensive locations, such as city centers. As a result, the packing system is also limited in size, and for example cannot use a lengthy conveyor belt.

SUMMARY

In one aspect of the invention an autonomous packing apparatus is provided, including a body, a shelf coupled to the body for placing goods, a shelf actuator for moving the shelf relative to the body, output device for outputting a packing material for packing the goods while the goods are located on the shelf, a computerized management system coupled to the shelf actuator and to the output device, including a set of instructions for outputting a first portion of the packing material before the goods are placed on the shelf, moving the shelf after the goods are placed on the shelf, outputting a second portion of the packing material after the goods are placed on the shelf.

In some cases, the packing apparatus further includes a heater for closing the packing material after outputting the second portion.

In some cases, the packing apparatus further includes a heated blower for outputting hot air after the heater closes the packing material.

In some cases, the output device includes two rollers for outputting the packing material from two opposite sides of the shelf.

In some cases, the packing apparatus further includes two covering actuators, where each of the two covering actuators is coupled to one of the two rollers, where each of the two covering actuators moves one of the two rollers rotationally.

In some cases, the packing apparatus further includes a sliding actuator coupled to the two rollers for sliding the two rollers against and towards the shelf.

In some cases, the packing apparatus further includes a roller pole coupled to the rollers, where the two rollers move along the roller pole, where the sliding actuator moves rotationally, where moving the sliding actuator in a first direction moves the two rollers towards the shelf and moving the sliding actuator in a second direction moves the two rollers away from the shelf.

In some cases, the packing apparatus further includes a heater for closing the packing material after outputting the second portion, where the heated is located lower than the rollers. In some cases, the shelf actuator moves the shelf downwards after outputting the first portion and before outputting the second portion. In some cases, the surface actuator moves the shelf upwards after outputting the second portion.

In another aspect of the invention a delivery station is provided, including a collector for collecting goods, a packing apparatus, including a body, a shelf coupled to the body for placing goods, a shelf actuator for moving the shelf relative to the body, output device for outputting a packing material for packing the goods while the goods are located on the shelf, a computerized management system coupled to the shelf actuator and to the output device, including a set of instructions for outputting a first portion of the packing material before the goods are placed on the shelf, moving the shelf after the goods are placed on the shelf, outputting a second portion of the packing material after the goods are placed on the shelf.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The invention, in embodiments thereof, enables autonomous stations that supply goods to package the goods in the station while still inside the delivery station. This requires the packing system to be both autonomous and limited in size.

The invention, in embodiments thereof, provides a fully autonomous packing system to pack goods. The term fully autonomous is defined in a manner that the station does not need any person to operate the components disclosed herein. The packing system can be used in stores, for example to pack goods bought by customers, or by a delivery person.

The delivery station includes physical components for receiving the goods, loading the goods in specific locations in the system, receiving orders and providing the orders. The delivery station includes a housing for example configured to prevent unauthorized persons to access the goods, and/or keeping the goods in desired conditions, for example a desired temperature and humidity ranges. The housing may be secured to a surface, such as a floor, pavement, for example using screws. The housing may include at least some of a group including a base, sidewalls extending upwards from the base and a ceiling. The housing can be either encompassing or an open-top platform, without a ceiling or having a ceiling covering only a portion of the housing's top.

The packing system is configured to operate inside, or on top, the housing. The packing system is configured to move in tandem with a collector of the delivery station that collects the goods from shelves/containers/pallets in which the goods are located. The packing system includes a body, a shelf coupled to the body for placing goods and a shelf actuator for moving the shelf relative to the body. The packing system also includes an output device for outputting a packing material for packing the goods while the goods are located on the shelf, such as polyethylene, polypropylene, polyolefin or other polymers or materials used for packing goods. The packing system also includes a computerized management system that manages the packing process. The computerized management system includes a memory for storing a set of instructions and a processor for executing the instructions. The computerized management system is coupled to the shelf actuator and to the output device, including a set of instructions for outputting a first portion of the packing material before the goods are placed on the shelf, performing an initial fusion of the material, moving the shelf after the goods are placed on the shelf and outputting a second portion of the packing material after the goods are placed on the shelf, performing a secondary fusion of the material and finally cutting the package free of the excess packing material.

The term "goods" refers to items that satisfy human wants and provide utility, for example, to a consumer making a purchase of a satisfying product. The goods in the delivery station may be packed, for example in cans, bottles, plastic boxes, cardboard boxes, bags made of polymers such as polyethylene and the like. The goods may be food products, beverages, electronic appliances, games, toys, clothes and the like.

The term "pallet" refers to a flat transport structure, which supports goods in a stable fashion while being lifted by another object, such as forklift, a pallet jack, a front loader, a jacking device, or an erect crane. A pallet is the structural foundation of a unit load which allows handling and storage efficiencies. The pallet may be secured with strapping, stretch wrap or shrink wrap. The pallets can also be made of plastic, metal, wood, paper, and other materials.

Figure 1:
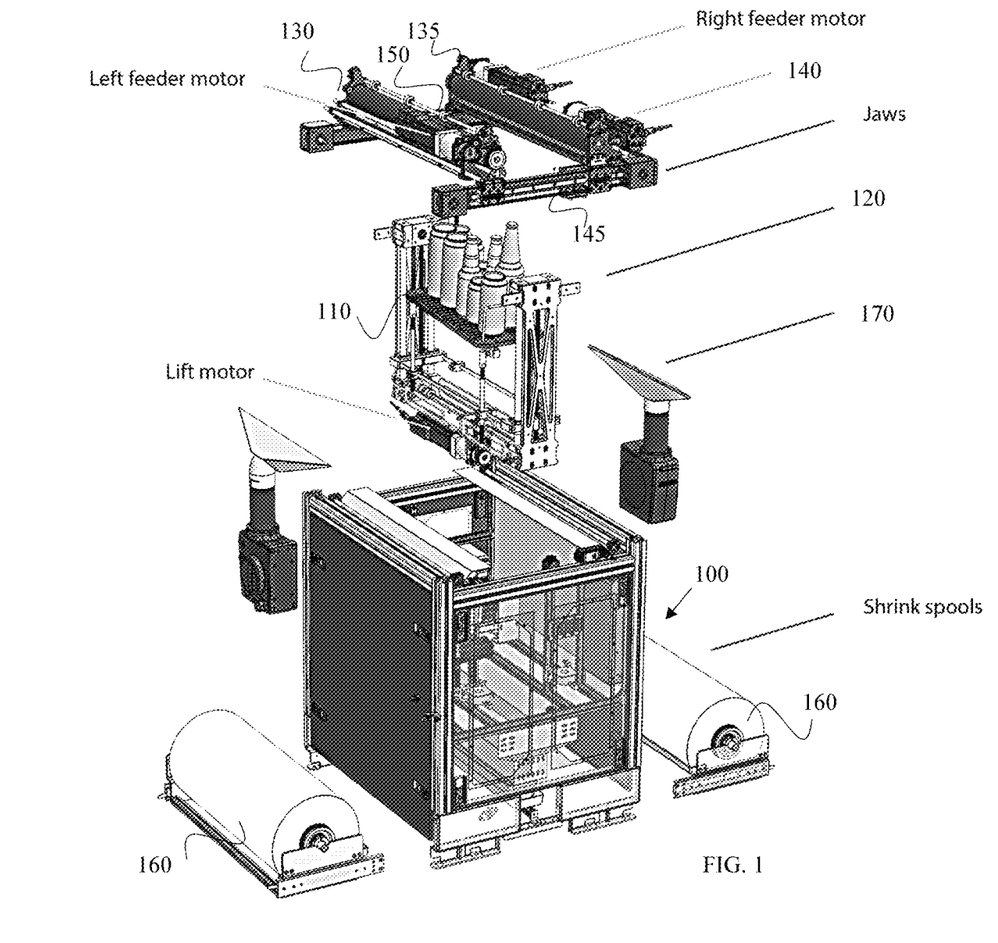
FIG. 1 shows an exploded view of the packing system, according to an exemplary embodiment of the invention.

FIG. 1 shows an exploded view of the packing system, according to an exemplary embodiment of the invention.

The packing system includes a body 100. The body 100 includes poles, bars and surfaces that enable the operation of the packing system. The body 100 may include a bottom surface that enables the body 100 to be carried by a movable member, for example along a track, or on a floor.

The packing system includes a shelf 110. The shelf 110 may be of a straight plain, meaning that all the upper surface in the shelf 110 have the same distance from a floor or base on which the body 100 is placed. In some other cases, the shelf 110 may be placed in a slope relative to the floor or base of the body 100, for example in the range of 1-30 degrees relative to the ground or to the floor. The shelf 110 may be coupled to the body 100, for example using movable bars that enable the shelf 110 to move relative to the body 100. The size and shape of the shelf 110 enable to carry goods in an amount desired by a person skilled in the art, for example in the range of 0.5-20 kilograms. The cross sectional shape of the shelf 110 may be polygonal, elliptical, a combination thereof, or any other shape. The shelf 110 may be coupled to limiting bars that prevent the goods from falling from the shelf 110 when the shelf 110 moves downwards and upwards when the packing material covers the goods located on the shelf 110.

The packing system includes a lift 120 for moving the shelf 110 upwards and downwards. The lift 120 is coupled to a shelf actuator that provides power to the lift 120. The power may be electrical, hydraulic, pneumatic and the like. The lift 120 is coupled to the body 100. The lift's mechanism is further elaborated below.

The packing system includes output devices 130, 135 for outputting the packing material, such as polyethylene, polypropylene, polyolefin or other polymers or materials used for packing goods. The output devices 130, 135 may be rollers that roll when providing the packing material. The packing material is stored in a packing material storage 160. The packing material may be arranged in a continuous layer, for example stacked or rolled around a storage roller. Thus, when the output devices 130, 135 roll, more packing material is transferred via the roller.

In some cases, the packing system includes a single output device 130 located near one of the sides of the shelf 110. In such case, the packing system includes a mechanism that collects the packing material from the single output device 130 and covers the goods placed on the shelf 110. The mechanism may be an arm or another kind of movable gripper capable of moving the packing material without damaging or tearing the packing material.

In some other cases, the packing system includes two output devices 130, 135, located on opposite sides of the shelf 110. The two output devices 130, 135 receive power from a roller actuator. The roller actuator receives commands to move the two output devices 130, 135 from the computerized management system. Movement of the two output devices 130, 135 results in outputting packing material from the two output devices 130, 135.

The two output devices 130, 135 may be located on an upper section of the body 100. The shelf 110 may have a loading position in the upper section of the body 100, facilitating the collector to place the goods on the shelf 110. When a new order is prepared, the two output devices 130, 135 output a first portion of the packing material, above the upper surface of the shelf 110. Then, the collector starts placing the collected goods on the shelf 110. After the goods are placed on the shelf 110, the lift 120 moves the shelf 110 and the goods downwards to a covering position. When the shelf is in the covering position, the computerized management system sends a command to the two output devices 130, 135 to output a second portion of the packing material. The computerized management system may include a processor, a controller, or any other software or hardware component configured to execute a set of instructions stored in a computer memory. The first portion and the second portion cover the goods placed on the shelf 110. The covering position is low enough to enable the second portion to cover the goods. For example, in case the goods are of 20 centimeters high, the covering position is in the range of 22-28 centimeters lower than the height of outputting the packing material. The height of outputting the packing material is defined as the location at the two output devices 130, 135 in which the packing material is transferred.

The packing system includes a roller actuator 140 and a roller pole 145. The roller pole may be an integral part of the body 100. The roller pole 145 expands along a horizontal axis, enabling horizontal movement of the two output devices 130, 135, towards the shelf 110 and away from the shelf 110. The horizontal movement of the two output devices 130, 135, may be defined as a movement towards the center of the body 100 and away from the center of the body 100. The two output devices 130, 135 slide along the roller pole 145, as elaborated below. The roller actuator 140 is coupled to the two output devices 130, 135. The roller actuator 140 may move rotationally, either clockwise or counterclockwise. For example, when the roller actuator 140 moves clockwise, the two output devices 130, 135 move closer to each other, and closer to the shelf 110. When the roller actuator 140 moves counterclockwise, the two output devices 130, 135 move away from each other, and away from the shelf 110.

The packing system may also include a heater 150 for closing the packing material after outputting the second portion. The heater 150 may be coupled to one of the output devices 130, 135, to enable the heater to move closer to the packing material that covers the goods on the shelf 110. When the heater is moved towards the shelf 110, the shelf may move to a closing position, in which the height of the packing material is in the height of the heater 150. The heater 150 may be an electrical wire receiving electric current. The electric current heats the electrical wire, the hot electrical wire heats the two parts of the packing material provided by the output devices 130, 135 until they become united.

The packing system may also include a heated blower 170 for outputting hot air after the heater closes the packing material. The hot air is used to shrink the packing material onto the goods.

Figure 2:
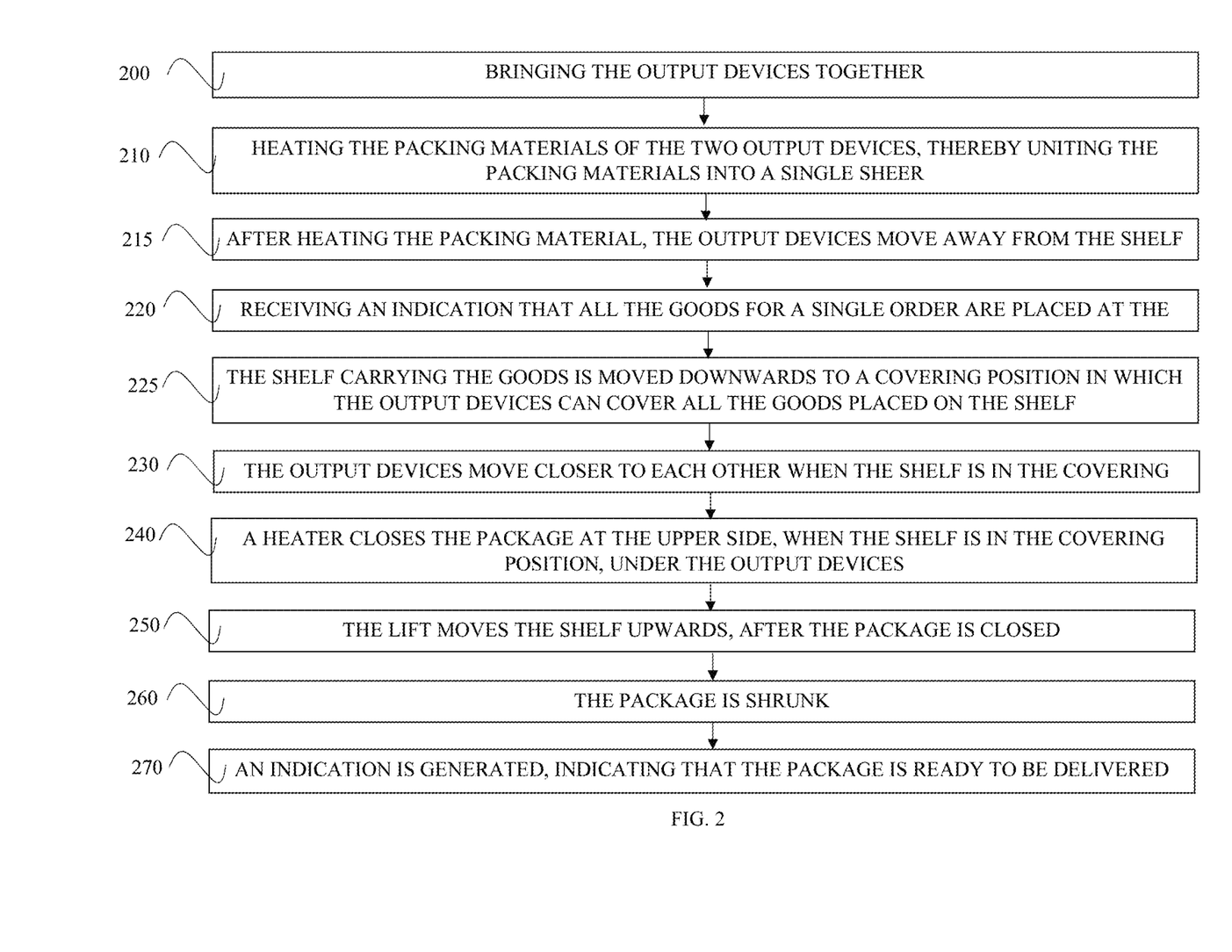
FIG. 2 shows a method for packing goods using the packing system, according to an exemplary embodiment of the invention.

FIG. 2 shows a method for packing goods using the packing system, according to an exemplary embodiment of the invention.

At 200, bringing the output devices together. This may be done by sliding the output devices along the roller pole, by activating the roller actuator coupled to the output devices. When moving the output devices, the output devices have packing material hanging therefrom, such that the packing materials of both output devices is in physical contact, touching each other.

At 210, heating the packing materials of the two output devices, thereby uniting the packing materials into a single sheer. Heating is performed when the two output devices are placed close to each other. Heating may be performed by a heater. The heater may be coupled to one of the heating devices, or to another mechanism such as a robotic arm. The heater may be activated electrically, for example based on change of voltage or electric current applied on the heater.

At 215, after heating the packing material, the output devices move away from the shelf. This enables the collector to place the goods on the shelf. Moving the heating devices may be enabled by activating the roller actuator coupled to the output devices.

At 220, receiving an indication that all the goods for a single order are placed at the shelf. The indication may be provided from the collector, from the computerized management system, from a sensor module that measures the accumulated weight on the shelf and the like. The indication provides a key that the goods can be packed.

At 225, the shelf carrying the goods is moved downwards to a covering position in which the output devices can cover all the goods placed on the shelf. The covering position may change according to the type and size of the goods and sent to the shelf actuator from the computerized management system.

At 230, the output devices move closer to each other when the shelf is in the covering position. This way, the packing material outputted by the output devices covers the goods on the shelf. The output devices may roll when outputting the second portion of the packing material. The roll is defined as a rotational movement of the output devices. The rotational movement may be generated by a roller actuator coupled to the output devices. When there is a need to cover the goods, or upon detection that the shelf is in the covering position, the roller actuator starts moving the output devices.

At 240, a heater closes the package at the upper side, when the shelf is in the covering position, under the output devices. Closing the package may be performed after receiving an indication that a sufficient amount of packing material is outputted by the output devices. The heating may be done by an electrical wire secured to one of the output devices. after closing the package, a knife may be used to separate the two sheets of packing material.

At 250, the lift moves the shelf upwards, after the package is closed.

At 260, the package is shrunk, for example by applying hot air from a heated blower. This process is optional.

At 270, an indication is generated, indicating that the package is ready to be delivered. Then, the package can be conveyed to a kiosk for pickup, or carried to a shelf, where it waits for the person to collect it.

Figure 3:
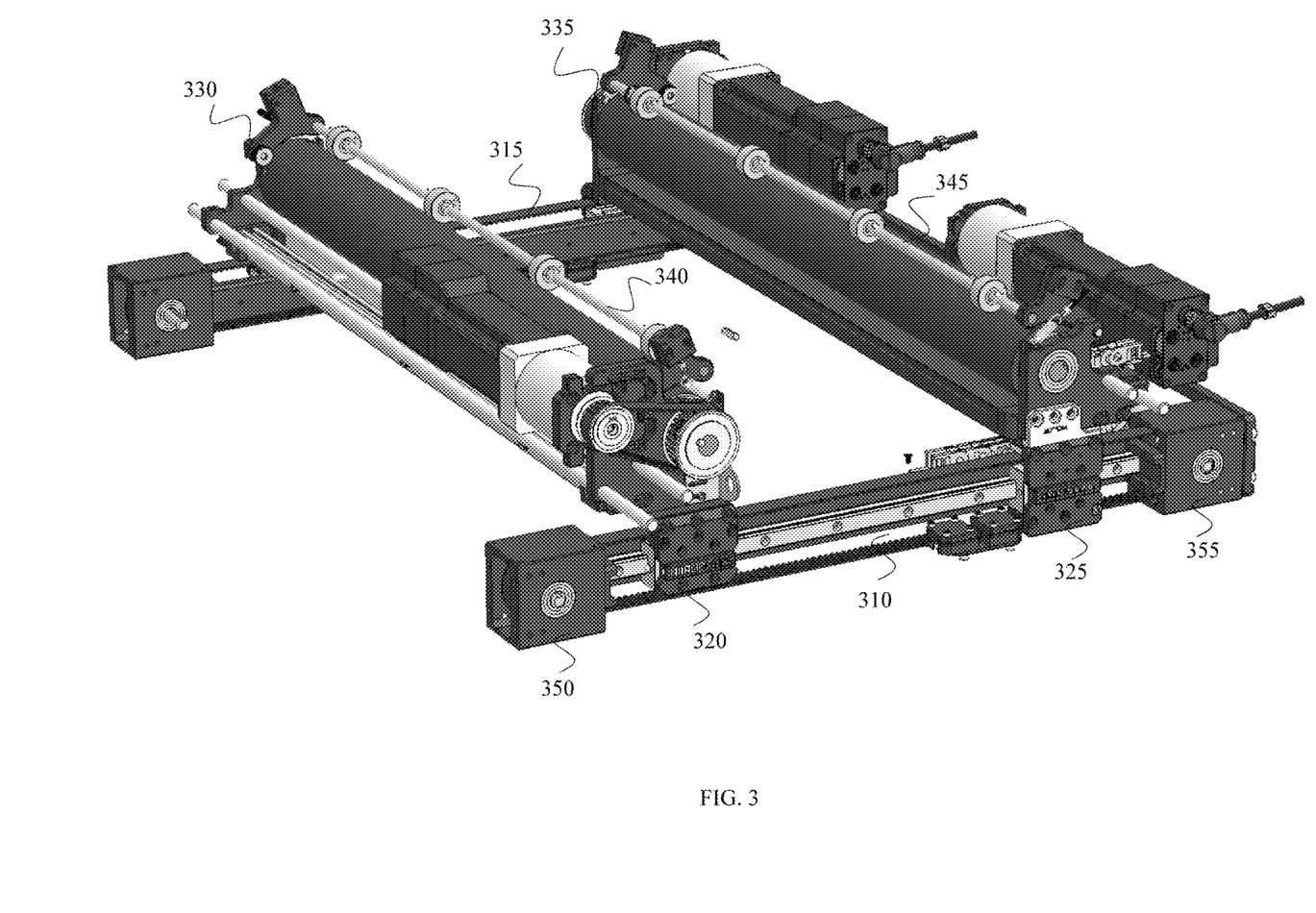
FIG. 3 shows a closing mechanism of the packing system, according to an exemplary embodiment of the invention.

FIG. 3 shows a closing mechanism of the packing system, according to an exemplary embodiment of the invention.

The closing mechanism is coupled to the body of the packing system. The closing mechanism is configured to dispense the packing material before the goods are placed on the shelf and to close the package after the goods are placed on the shelf.

The closing mechanism includes rollers 330, 335 for outputting the packing material. The rollers 330, 335 are coupled to the body of the packing system, for example via roller poles 310, 315. The rollers 330, 335 move along the roller poles 310, 315 when packing the goods located on the shelf. The rollers 330, 335 also move rotationally when providing the packing material towards the shelf. The roller poles 310, 315 are affixed to the body of the packing system.

The closing mechanism includes guiding rollers 340, 345 for guiding the packing material when outputted towards the shelf. The guiding roller 340 is secured to roller 330 and guiding roller 345 is secured to roller 335. The guiding rollers 340, 345 are configured to maintain the packing material tensed when outputted.

The closing mechanism includes sliders 320, 325 that enable the rollers 330, 335 to slide along the roller poles 310, 315. The sliders 320, 325 are coupled to a pulley 350, 355 or to another mechanism movable by sliding actuators. The pulley 350, 355 is coupled to a sliding actuator that moves the pulley 350, 355 rotationally. When moving the sliding actuator in a first direction, for example clockwise, the pulley 350, 355 moves the two rollers 330, 335 towards the shelf. Similarly, when moving the sliding actuator in a second direction, for example counterclockwise, the pulley 350, 355 moves the two rollers 330, 335 away from the shelf. Away from the shelf may also be defined away from each other, meaning the distance on the horizontal axis increases.

Figure 4A:
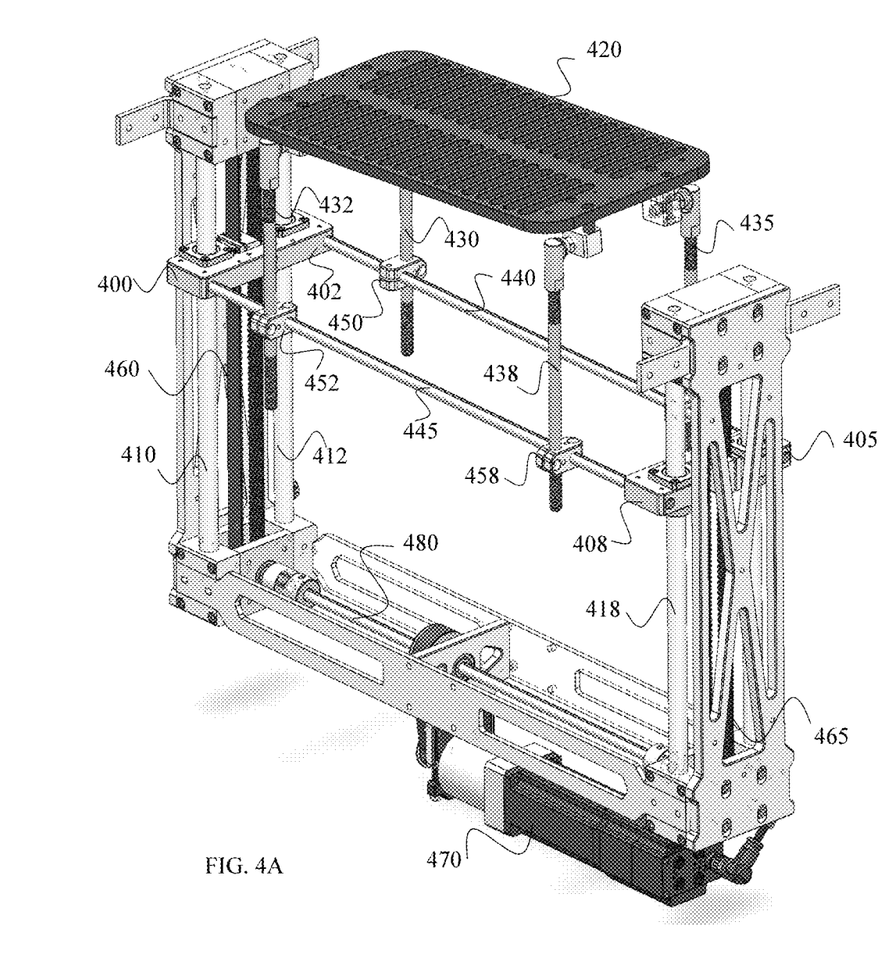
FIGS. 4A-4B show the shelf moving downwards relative to the rollers, according to an exemplary embodiment of the invention.
Figure 4B:
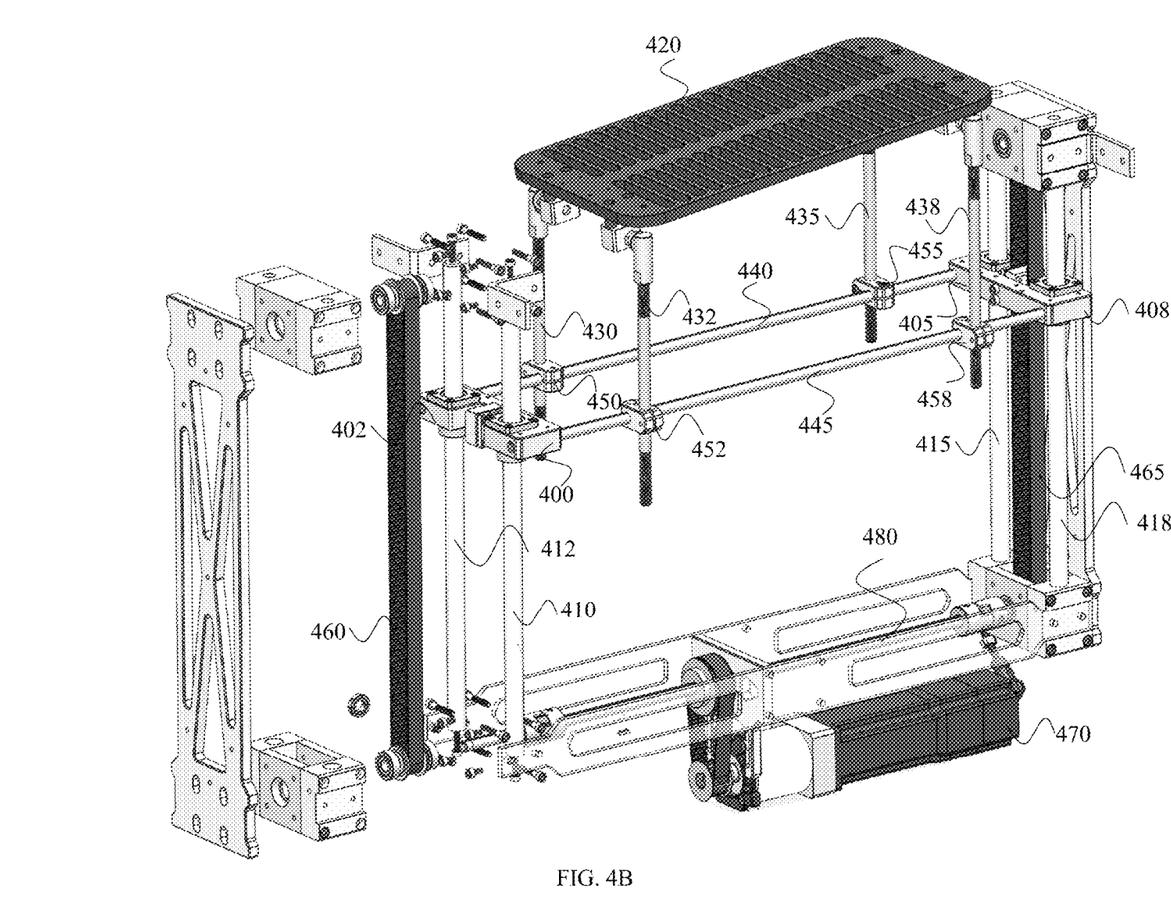

FIGS. 4A-4B show the shelf moving downwards relative to the rollers, according to an exemplary embodiment of the invention.

The shelf 420 is coupled to legs 430, 432, 435, 438. The legs 430, 432, 435, 438 keep the shelf 420 relatively horizontal, enabling the goods to firmly stand on the shelf 420 when the shelf 420 moves downwards and upwards. The legs 430, 432, 435, 438 may be coupled to the general area of the shelf 420 corners. In some cases, the shelf's shape is not polygonal, for example elliptical or having other shapes, and the number of legs may vary according to the design selected by a person skilled in the art. The legs 430, 432, 435, 438 are coupled to sliders 440, 445 that slide along main poles 410, 412, 415, 418. The main poles 410, 412, 415, 418 may be coupled to the body of the packing system, to stabilize the shelf's movement. The main poles 410, 412, 415, 418 are substantially vertical, extending upwards from a bottom part of the packing system.

The legs 430, 432, 435, 438 are coupled to sliders 440, 445 via legs connectors 450, 452, 455, 458 respectively, such that each slider is coupled to two legs. Similarly, the sliders 440, 445 are coupled to the main poles 410, 412, 415, 418 via slider connectors 400, 402, 405, 408. The slider connectors 400, 402, 405, 408 slide along the main poles 410, 412, 415, 418, enabling upward and downward movement of the shelf 420. Other mechanisms may also be selected to implement the upward and downward movement of the shelf 420.

The packing system includes a shelf motor 470 configured to generate movement to move the shelf 420 upwards and downwards. The shelf motor 470 may be coupled to a shaft 480. The shaft is coupled to two pulleys 460, 465. First pulley 460 is coupled to the slider connectors 400, 402 and second pulley 465 is coupled to the slider connectors 405, 408. The shaft 480 moves the pulleys 460, 465, which move the slider connectors 400, 402, 405, 408 to a desired height. The desired height may be determined by a controller coupled to the shelf motor 470. The controller may send commands to the shelf motor 470, the commands may indicate the desired height of the shelf 420, or a desired distance to move the shelf 420 upwards or downwards.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiments disclosed herein.

What is claimed is:

1. An autonomous packing apparatus, comprising:
    a body;
    a shelf coupled to the body for placing goods;
    a shelf actuator for moving the shelf relative to the body;
    an output device for outputting a packing material for packing the goods while the goods are located on the shelf;
    a computerized management system coupled to the shelf actuator and to the output device, the computerized management system comprising a set of instructions for:
        outputting a first portion of the packing material before the goods are placed on the shelf,
        after the goods are placed on the shelf, moving the shelf downwards, under the output device, and
        outputting a second portion of the packing material after the goods are placed on the shelf,
    wherein the shelf actuator moves the shelf to a distance computed according to a type and size of the goods as received from the computerized management system, and
    wherein the output device comprises two rollers for outputting the packing material from two opposite sides of the shelf; and
    two covering actuators, wherein each of the two covering actuators is coupled to one of the two rollers, and wherein each of the two covering actuators moves one of the two rollers rotationally.

2. The packing apparatus of claim 1, further comprising a heater for closing the packing material after outputting the second portion.

3. The packing apparatus of claim 2, further comprising a heated blower for outputting hot air after the heater closes the packing material.

4. The packing apparatus of claim 1, further comprising a sliding actuator coupled to the two rollers for sliding the two rollers away from and towards the shelf.

5. The packing apparatus of claim 4, further comprising a roller pole coupled to the rollers, wherein the two rollers move along the roller pole, wherein the sliding actuator moves rotationally, wherein moving the sliding actuator in a first direction moves the two rollers towards the shelf, and wherein moving the sliding actuator in a second direction moves the two rollers away from the shelf.

6. The packing apparatus of claim 1, further comprising a heater for closing the packing material after outputting the second portion, wherein the heater is located lower than the rollers.

7. The packing apparatus of claim 1, wherein the shelf actuator moves the shelf downwards after outputting the first portion and before outputting the second portion.

8. The packing apparatus of claim 1, wherein the shelf actuator moves the shelf upwards after outputting the second portion.

9. An autonomous packing apparatus, comprising:
    a body;
    a shelf coupled to the body for placing goods;
    a shelf actuator for moving the shelf relative to the body;
    an output device for outputting a packing material for packing the goods while the goods are located on the shelf;
    a computerized management system coupled to the shelf actuator and to the output device, the computerized management system comprising a set of instructions for:
        outputting a first portion of the packing material before the goods are placed on the shelf,
        after the goods are placed on the shelf, moving the shelf downwards, under the output device, and
        outputting a second portion of the packing material after the goods are placed on the shelf,
    wherein the shelf actuator moves the shelf to a distance computed according to a type and size of the goods as received from the computerized management system, and
    wherein the output device comprises two rollers for outputting the packing material from two opposite sides of the shelf; and
    a sliding actuator coupled to the two rollers for sliding the two rollers away from and towards the shelf.

10. The packing apparatus of claim 9, further comprising a heater for closing the packing material after outputting the second portion.

11. The packing apparatus of claim 10, further comprising a heated blower for outputting hot air after the heater closes the packing material.

12. The packing apparatus of claim 9, further comprising two covering actuators, wherein each of the two covering actuators is coupled to one of the two rollers, and wherein each of the two covering actuators moves one of the two rollers rotationally.

13. The packing apparatus of claim 9, further comprising a roller pole coupled to the rollers, wherein the two rollers move along the roller pole, wherein the sliding actuator moves rotationally, wherein moving the sliding actuator in a first direction moves the two rollers towards the shelf, and wherein moving the sliding actuator in a second direction moves the two rollers away from the shelf.

14. The packing apparatus of claim 9, further comprising a heater for closing the packing material after outputting the second portion, wherein the heater is located lower than the rollers.

15. The packing apparatus of claim 9, wherein the shelf actuator moves the shelf downwards after outputting the first portion and before outputting the second portion.

16. The packing apparatus of claim 9, wherein the shelf actuator moves the shelf upwards after outputting the second portion.

* * * * *